United States Patent
Obayashi et al.

(10) Patent No.: US 7,473,206 B2
(45) Date of Patent: Jan. 6, 2009

(54) ENGINE CONTROLLER AND CONTROL METHOD

(75) Inventors: Kazuyoshi Obayashi, Chita-gun (JP); Keisuke Tani, Nagoya (JP); Yukihiro Yamashita, Takahama (JP); Daisuke Kuroda, Kariya (JP)

(73) Assignee: Denso Corporation (JP)

( * ) Notice: Subject to any disclaimer, the term of this patent is extended or adjusted under 35 U.S.C. 154(b) by 408 days.

(21) Appl. No.: 11/488,758

(22) Filed: Jul. 19, 2006

(65) Prior Publication Data
US 2007/0021267 A1    Jan. 25, 2007

(30) Foreign Application Priority Data
Jul. 19, 2005    (JP)    ............................. 2005-208605

(51) Int. Cl.
*B60W 10/04*    (2006.01)
(52) U.S. Cl. ........................ 477/107; 477/110; 180/65.4
(58) Field of Classification Search ................. 477/107, 477/110; 180/65.4
See application file for complete search history.

(56) References Cited

U.S. PATENT DOCUMENTS

| | | | |
|---|---|---|---|
| 4,589,302 A * | 5/1986 | Oda et al. ..................... | 477/32 |
| 4,891,759 A * | 1/1990 | Kato .......................... | 701/54 |
| 6,258,008 B1 * | 7/2001 | Tabata et al. ................ | 477/107 |
| 6,561,296 B2 | 5/2003 | Obayashi | |

FOREIGN PATENT DOCUMENTS

| JP | 06146945 A | * | 5/1994 |
|---|---|---|---|
| JP | 11-036915 | | 2/1999 |
| JP | 2001-207879 | | 8/2001 |
| JP | 2003-269216 | | 9/2003 |
| JP | 2004-068664 | | 3/2004 |

* cited by examiner

*Primary Examiner*—Ha D. Ho
(74) *Attorney, Agent, or Firm*—Nixon & Vanderhye PC

(57) ABSTRACT

An engine controller controls an engine, which drives a generator, an auxiliary device, and a vehicle. The generator generates electricity, and supplying the electricity to a battery and a plurality of current consumers. A generator controller controls the generator. An auxiliary device controller controls the auxiliary device. An electric power generation calculation unit calculates one of a requested power generation of the generator and a present power generation of the generator. An engine speed changing unit evaluates tendency of power generation on the basis of the one of the requested power generation and the present power generation. The engine speed changing unit requests increase or decreases in the engine speed when the engine speed changing unit determines the power generation to be inclined toward shortage or excess.

40 Claims, 9 Drawing Sheets

ENGINE CONTROLLER AND CONTROL METHOD

CROSS REFERENCE TO RELATED APPLICATIONS

This application is based on and incorporates herein by reference Japanese Patent Application No. 2005-208605 filed on Jul. 19, 2005.

FIELD OF THE INVENTION

The present invention relates to an engine controller and a control method.

BACKGROUND OF THE INVENTION

An engine of a vehicle generates torque for generating cruising power, and for driving a generator and an auxiliary device such as a compressor for an air conditioner.

In an example of a first control, an engine in an idling operation generally performs feedback control to maintain the idling speed at a constant speed. In this idling operation of the first control, a target rotation speed in the idling operation is set in accordance with an ON/OFF signal of a compressor.

According to an example of a second control published in each of JP-A-2003-269216 and JP-A-2004-68664, a controller increases the idling speed of an engine to boost electric power generated using an electric generator when the controller detects low voltage or decrease in remaining capacity of a battery due to shortage in generating performance of the electric generator.

In the first control, the idling speed is controlled by operating only an intermittent ON/OFF signal of a controlled device, i.e., the auxiliary device. Therefore, in this first control, the idling speed is controlled irrespective of states of uncontrolled devices such as the engine, the generator, and other devices. Consequently, controllability is not necessarily excellent. For example, drive torque of the generator and other devices may act oppositely to the operation of the intermittent ON/OFF signals of the controlled device in the idling operation. In the first control, adverse effects due to the opposite acts are not taken into consideration, consequently the idling speed may be wastefully operated. In addition, the engine speed may not be quickly increased from the idling rotation.

In the second control, the controller may not instruct to increase engine speed until the controller detects lowering in battery charged level. Accordingly, shortage in engine speed may be continued, and such continuous shortage exerts an adverse influence to the battery life. In consideration of this adverse influence, the engine speed may be changed in response to a small change in battery charged level. However, in this case, control response may become excessively quick, consequently the control may cause hunting.

In each of the first and second control systems has a relatively simple structure. For example, the engine speed is changed in accordance with input parameters such as intermission of the auxiliary device and the state of battery charging. In these simple structures, effect produced by the controls may be limitative.

SUMMARY OF THE INVENTION

In view of the foregoing and other problems, it is an object of the present invention to produce an engine controller for controlling at least one of generating electric power and engine torque. It is another object to produce a method for controlling the engine.

According to one aspect of the present invention, an engine speed controller is provided to a vehicle energy control system that includes an engine controller, a generator controller, and an auxiliary device controller. The engine controller controls an engine, which drives a generator, an auxiliary device, and a vehicle. The generator generates electricity and supplying the electricity to a battery and a plurality of current consumers. The generator controller controls the generator. The auxiliary device controller controls the auxiliary device. The engine speed controller performs a feedback control such that engine speed substantially coincides at a target value. The engine speed controller includes an electric power generation calculation unit that calculates one of a requested power generation and a present power generation of the generator. The engine speed controller further includes an engine speed changing unit that evaluates tendency of power generation on the basis of the one of the requested power generation and the present power generation. The engine speed changing unit requests increase in the engine speed when the engine speed changing unit determines the power generation to be inclined toward shortage. The engine speed changing unit requests decrease in the engine speed when the engine speed changing unit determines the power generation to be inclined toward excess.

Alternatively, the engine speed controller includes an engine torque calculation unit that calculates one of a requested engine torque and a present engine torque of the engine. The engine speed controller further includes an engine speed changing unit that evaluates tendency of engine torque on the basis of the one of the requested engine torque and the present engine torque. The engine speed changing unit requests increase in the engine speed when the engine speed changing unit determines the engine torque to be inclined toward shortage. The engine speed changing unit requests decrease in the engine speed when the engine speed changing unit determines the engine torque to be inclined toward excess.

Alternatively, a control method includes calculating one of a requested power generation and a present power generation performed using a generator driven by an engine for generating electricity. The method further includes evaluating tendency of power generation on the basis of the one of the requested power generation and the present power generation. The method further includes requesting increase in the engine speed when determining the power generation to be inclined toward shortage. The method further includes requesting decrease in the engine speed when determining the power generation to be inclined toward excess. The method further includes operating the engine speed in accordance with the request of the engine speed.

Alternatively, a control method includes calculating one of a requested engine torque and a present engine torque of an engine that drives a generator for generating electricity. The method further includes evaluating tendency of engine torque on the basis of the one of the requested engine torque and the present engine torque. The method further includes requesting increase in the engine speed when determining the engine torque to be inclined toward shortage. The method further includes requesting decrease in the engine speed when determining the engine torque to be inclined toward excess. The method further includes operating the engine speed in accordance with the request of the engine speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
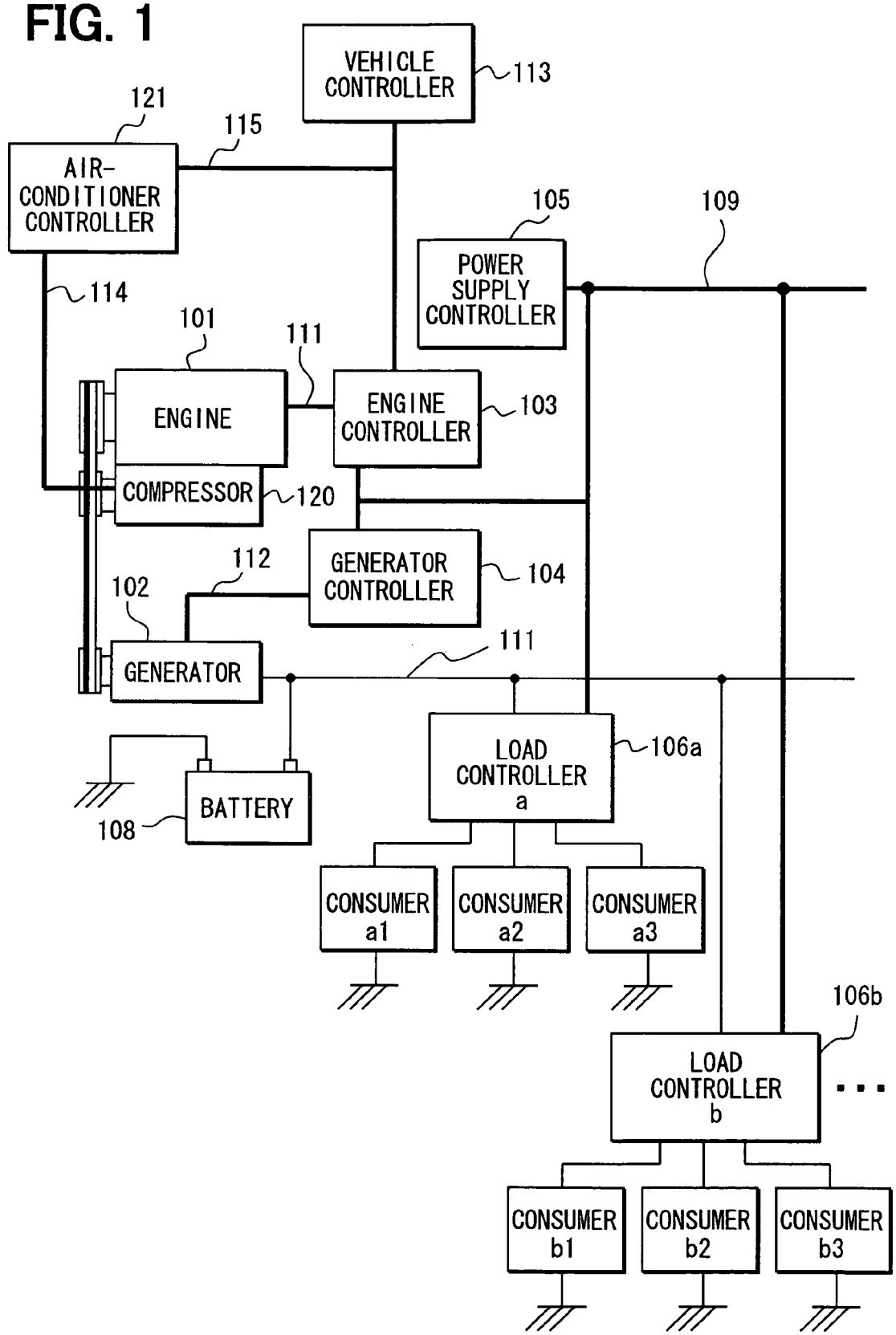
FIG. 1 is a block diagram showing an energy control system according to an embodiment.

A vehicle energy control system will be described with reference to FIG. 1.

An engine 101 is connected to an electric generator 102 and a compressor 120 via a belt. The compressor 120 is provided for airconditioning of a vehicle. The electric generator 102 is connected to a battery 108, load controllers 106a, 106b, and another load controller (not shown) via a power supply line 111 to construct a power supply system.

An engine controller 103 controls the engine 101, an electric generator controller 104, a power supply controller 105, an air-conditioner controller (auxiliary device controller) 121, and a vehicle controller 113. The electric generator controller 104 controls the electric generator 102. The power supply controller 105 controls the power supply system. The air-conditioner controller 121 controls an air-conditioner including the compressor 120. The vehicle controller 113 controls various operations such as a cruising operation of the vehicle.

Each of these controllers includes a microcomputer, for example. The controllers are adapted to communicating to one another through communication network shown by solid lines of double width. Specifically, a bus (electric power information bus) 109 is capable of communicating among the electric generator controller 104, the engine controller 103, the power supply controller 105, and the load controllers 106a, 106b. A serial communication line 112 is capable of communicating the electric generator 102 with the electric generator controller 104. A serial communication line 114 is capable of communicating the compressor 120 with the air-conditioner controller 121. A torque information bus 115 is capable of communicating among the vehicle controller 113, the engine controller 103, and the air-conditioner controller 121. Various communication systems can be applied to the transmission of data and signals among the respective controllers.

The engine controller 103 controls the engine 101 on the basis of information, which is transmitted from sensors (not shown) and external devices. The sensors are provided for detecting various states of the engine 101 and indicating an operating state of the engine 101. The engine controller 103 transmits information, which is obtained by the sensors and external devices, and results of internal calculation of the engine controller 103 to other devices.

The electric generator controller 104 controls generation of electric power performed using the electric generator 102 on the basis of information transmitted from the electric generator 102 and commands transmitted from the power supply controller 105 and the engine controller 103. The electric generator controller 104 transmits a state of the electric generator 102 and results of internal calculation of the electric generator controller 104 to the engine controller 103 and the power supply controller 105.

The power supply controller 105 conducts communication with the engine controller 103, the electric generator controller 104, and the load controllers 106a, 106b, to calculate a necessary amount of an electric current on the basis of states of respective current consumers including current consumers a1 to a3, b1 to b3 and a state of the battery 108. In addition, when the power supply system is substantially constant in voltage, the generated electric current may correspond to an amount of electric power generation (requested electric power generation), which is requested. In addition, a current sensor is provided to detect charged and discharged electric current of the battery 108 in order to detect charged and discharged electric power of the battery 108.

The load controller 106a performs a distribution control of the current consumers a1 to a3. The load controller 106b performs a distribution control of the current consumers b1 to b3. Another load controller likewise performs a distribution control of multiple current consumers. The load controllers 106a, 106b include operation switches (not shown) required for the control and various sensors (not shown) such as current sensors for the control. The load controllers 106a, 106b perform output controls and interrupt a load belonging to load controllers 106a, 106b in accordance with external input signals and output signals of the sensors.

The vehicle controller 113 transmits commands to the engine controller 103 and the air-conditioner controller 121 on the basis of a state of a transmission device and a driver's intention. The driver's intention is represented by a state of an ignition switch, a state of an air-conditioner operating panel, and a cruising command, for example. The cruising command is transmitted from each of external devices such as an accelerator pedal and a brake pedal.

According to the commands transmitted from the vehicle controller 113, the engine controller 103 controls the engine 101, and the air-conditioner controller 121 controls the air-conditioner. The engine controller 103 and the air-conditioner controller 121 respectively transmit states of the engine 101 and the air-conditioner to the vehicle controller 113. Furthermore, the vehicle controller 113 calculates torque (cruising torque), which corresponds to torque that the engine 101 needs to generate for cruising the vehicle.

The air-conditioner controller 121 controls an operation of the air-conditioner, in particular, the compressor of the air-conditioner. The air-conditioner controller 121 detects the rotation speed of the compressor, thereby outputting a signal, which indicates the rotation speed, to an external device.

Next, operations of the system are described. In this embodiment, requested engine torque is calculated. The requested engine torque corresponds to an engine torque needed for the vehicle. The engine 101 is controlled to generate engine torque corresponding to the requested engine torque. For example, requested engine torque (load torque value) is calculated and the engine torque corresponding to the calculated requested engine torque is generated. This engine control system serves as a torque base engine control system. Controls for generating engine torque corresponding to the requested engine torque may adopt generally known control methods.

For example, the engine control may adopt an operation mode (engine speed control mode). Specifically, the engine speed is feedback controlled at a predetermined level in the engine speed control mode. For example, the engine speed control mode may adopt an idling rotation control (ISC). In addition, the engine torque corresponding to the requested engine torque is also generated in the engine speed control mode, so that the engine speed is simultaneously maintained at a predetermined target value.

A further description of setting the engine speed in the idling rotation control will be specifically given.

Figure 2:
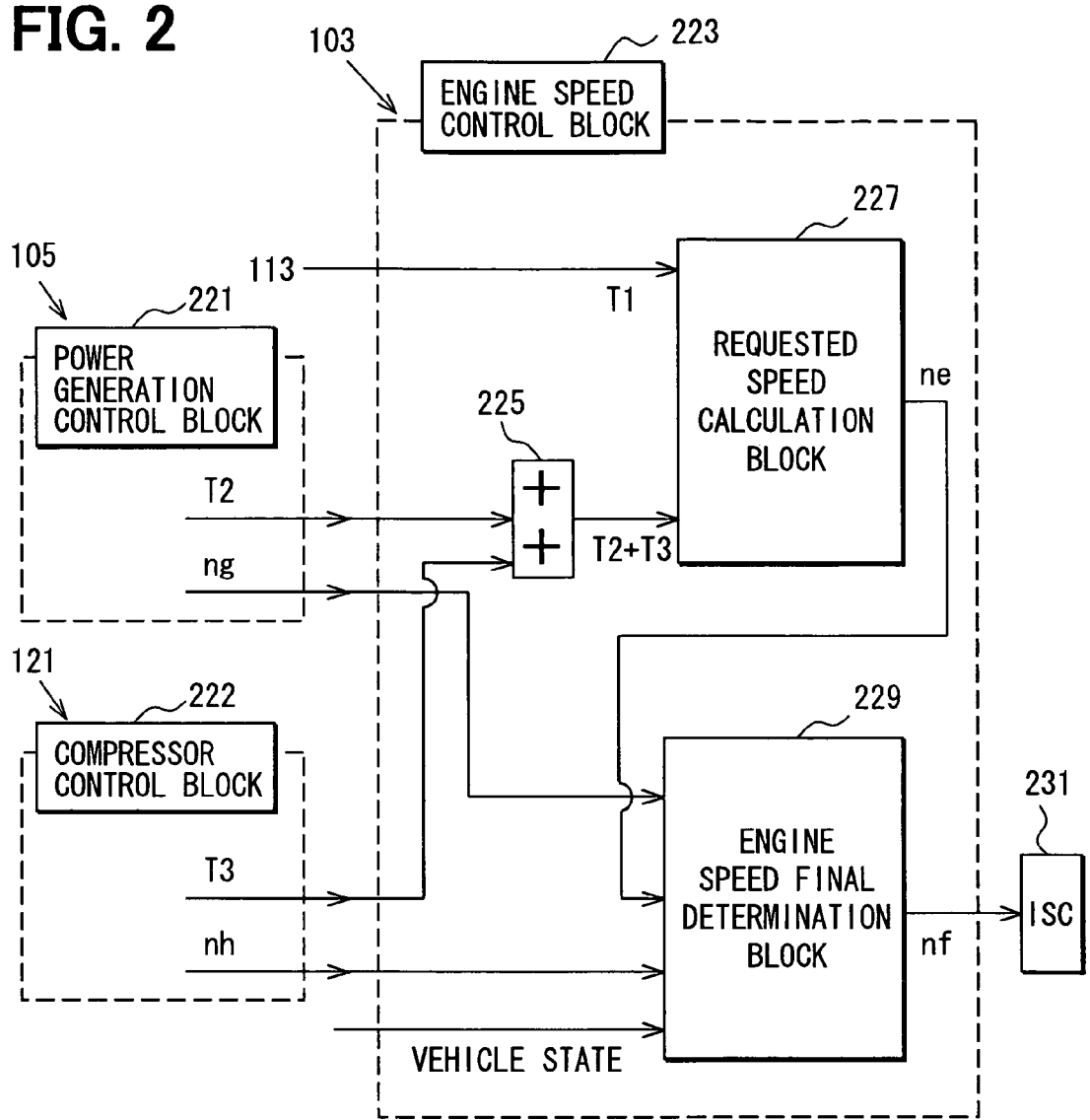
FIG. 2 is a block diagram showing control blocks of the energy control system according to the embodiment.

An example of the engine speed control mode in the state of idling rotation will be described with reference to FIG. 2.

As described above, the control is performed to generate the engine torque corresponding to the requested engine torque. Requested engine torque T0 corresponding to an engine load torque is defined as the sum of requested vehicle drive torque T1, requested power generating torque T2, and requested auxiliary device torque T3. The requested vehicle drive torque T1 represents torque required for the vehicle operation such as cruising. The requested power generating torque T2 represents torque required for driving the electric generator 102. The requested auxiliary device torque T3 represents torque required for driving an auxiliary device such as the compressor 120. The auxiliary device may include a device other than the compressor 120. In this embodiment, the requested vehicle drive torque T1 includes drive torque for an auxiliary device other than the compressor 120.

In this embodiment, the vehicle controller 113 calculates the requested vehicle drive torque T1, and outputs the requested vehicle drive torque T1 to the engine speed control block 223 in the engine controller 103. A power generation control block 221 in the power supply controller 105 calculates the requested power generating torque T2, and outputs the requested power generating torque T2 to the engine speed control block 223 in the engine controller 103. A compressor control block 222 in the air-conditioner controller 121 calculates the requested auxiliary device torque T3, and outputs the requested auxiliary device torque T3 to the engine speed control block 223 in the engine controller 103. Constructions among the controllers and calculation blocks may be determined as appropriate.

The engine speed control block 223 receives the requested power generating torque T2 and the requested auxiliary device torque T3. The engine speed control block 223 includes a totalizer 225 that adds the requested power generating torque T2 and the requested auxiliary device torque T3 to calculate a total requested auxiliary device torque T2+T3. The engine speed control block 223 outputs the total requested auxiliary device torque T2+T3 to a requested speed calculation block 227. The requested speed calculation block 227 also receives the requested vehicle drive torque T1 from the vehicle controller 113. The requested speed calculation block 227 adds the requested vehicle drive torque T1 and the total requested auxiliary device torque T2+T3 to calculate the requested engine torque T0. The requested speed calculation block 227 calculates a requested speed ne on the basis of the requested engine torque T0. The requested speed ne indicates engine speed suited to driving the engine.

In this embodiment, the power generation control block 221 also calculates a requested speed ng on the basis of the requested power generating torque T2. The requested speed ng may be preferred engine speed. The compressor control block 222 also calculates a requested speed nh on the basis of the requested auxiliary device torque T3. The requested speed nh may be preferred engine speed. The respective requested speeds ne, ng, and nh are output to an engine speed final determination block 229.

The engine speed final determination block 229 receives a vehicle state indicating the condition of the vehicle, so that the engine speed final determination block 229 determines a final requested speed nf on the basis of the vehicle state and the respective requested speeds ne, ng, and nh. The engine speed final determination block 229 outputs the requested speed nf to an idling speed control system (ISC) 231. The requested speed nf serves as a target value in the speed feedback control.

A description will be given to the operation of the requested speed calculation block 227. In order to secure a margin (Temax−T0) of the engine torque, the requested speed calculation block 227 evaluates whether the engine speed needs to be increased, on the basis of a maximum engine torque Temax beforehand stored and the requested engine torque T0. The maximum engine torque Temax corresponds to torque, which can be generated at the present engine speed. The requested speed calculation block 227 increases the requested speed ne when increase in speed is desired, and decreases the requested speed ne when decrease in speed is desired.

When the requested engine torque T0 is in the vicinity (for example, over 90%) of the maximum engine torque Temax at the present engine speed, the torque margin is considered to be small for accelerating the vehicle. In this condition, drivability may be degraded. Therefore, in this case, the engine speed is increased to secure the torque margin for improving drivability. Conversely, when the requested engine torque T0 is considerably less than the maximum engine torque Temax at the present engine speed, fuel consumption may become worse due to increase in mechanical loss. In view of these tendencies, the requested speed calculation block 227 operates the requested speed ne.

Next, a description will be given to the operation of the engine speed final determination block 229. The engine speed final determination block 229 selects the maximum value of the requested speeds ne, ng, and nh, which are input to the engine speed final determination block 229. The engine speed final determination block 229 outputs the maximum value of the respective requested speeds ne, ng, and nh as the final requested speed nf to the ISC 231 of the engine or a transmission controller. In addition, the engine speed final determination block 229 defines limits such as upper and lower limits of the final requested speed nf on the basis of the vehicle state.

In this embodiment, the vehicle state represents a condition, in which the vehicle having a torque converter stops and the shift position of the vehicle is in the D range, for example. The engine speed final determination block 229 restricts the engine speed from causing drastic increase in this vehicle state. Thereby, creep force can be restricted from unnecessarily increasing. Consequently, the vehicle can be restricted from causing rush due to the creep force. The vehicle state may be in a condition, in which the vehicle is cruising around a curved road. In this case, the engine speed is restricted from drastically changing, so that the vehicle is capable of safely turning around the curved road.

Figure 3:
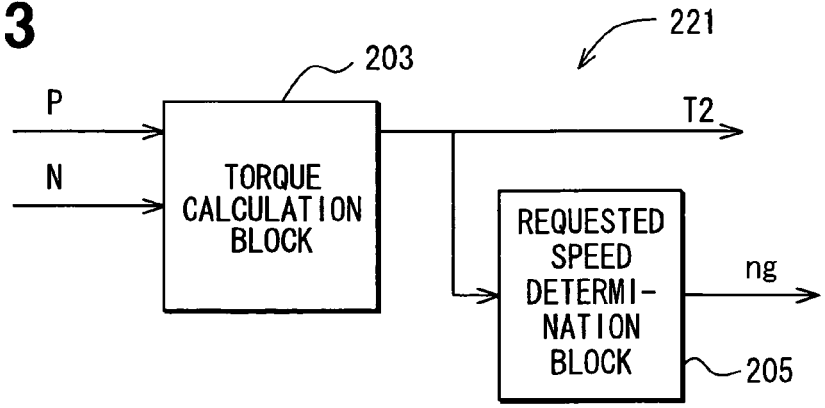
FIG. 3 is a block diagram showing a power generation control block of the energy control system according to the embodiment.

Subsequently, a further description will be given to the operation of the engine speed control in the power generation control block 221 shown in FIG. 2 with reference to FIG. 3. As described above, the power supply controller 105 calculates a requested electric power (electric power generation) P, which corresponds to an amount of necessary generated electric current, on the basis of states of respective current consumers including the current consumers a1 to a3, b1 to b3 and a state of the battery 108.

The power supply controller 105 may calculate present electric power P. The power supply controller 105 may serve as an electric power generation calculation unit.

The power generation control block 221 included in the power supply controller 105 has a torque calculation block 203 and a requested speed determination block 205. The torque calculation block 203 calculates the requested power generating torque T2, which is requested torque for driving the electric generator, on the basis of the requested electric power P and an actual rotation speed N. The engine speed is adopted as the actual speed N so as to represent the torque on an engine basis. The relationship among the requested power generating torque T2, the actual speed N, and the requested electric power P are defined by the following formula: $T2 \cdot 2\pi N = P/\eta$ where $\eta$ indicates an efficiency of the electric generator 102. The requested power generating torque T2 is calculated in accordance with the formula. The requested power generating torque T2 represents the requested torque for electric power generation.

Subsequently, a description will be given to the operation of the requested speed determination block 205. The requested speed determination block 205 evaluates whether the engine rotation speed needs to be increased, on the basis of a maximum electric power generation (maximum generation) Pmax beforehand stored and the requested electric power generation (requested electric power) P. The maximum generation Pmax represents power, for which the electric generator is capable of generating at the present engine speed. The present engine speed substantially corresponds to the rotation speed (electric generator speed) of the electric generator. In this operation, the requested speed determination block 205 increases the requested rotation speed ng when increase in speed is desired, and decreases the requested rotation speed ng when decrease in speed is desired, such that a ratio of the maximum generation Pmax and the requested electric power P is controlled within a preferred range.

The calculation for regulating the requested rotation speed ng may be performed based on the maximum electric power generation torque (maximum generation torque) Tmax, instead of being based on the maximum generation Pmax and the requested electric power P. The maximum generation torque Tmax is calculated by substituting the maximum generation Pmax and an engine rotation speed N into the following formula: $Tmax \cdot 2\pi N = Pmax/\eta$.

The maximum generation torque Tmax represents torque, for which the electric generator is capable generating at the engine speed. It is evaluated whether the engine rotation speed needs to be increased, so that a ratio of the requested power generating torque T2 and the maximum generation Pmax falls in a preferred range. The requested rotation speed ng is increased when increase in speed is desired. The requested rotation speed ng is decreased when decrease in speed is desired.

Furthermore, when the requested power generating torque T2 is in the vicinity (for example, over 90%) of the maximum generation torque Tmax at the present engine speed, it is requested to increase the requested rotation speed ng. When the requested power generating torque T2 decreases below a predetermined ratio (for example, over 30%) relative to the maximum generation torque Tmax at the present engine speed, it is requested to decrease the requested rotation speed ng.

Figure 4:
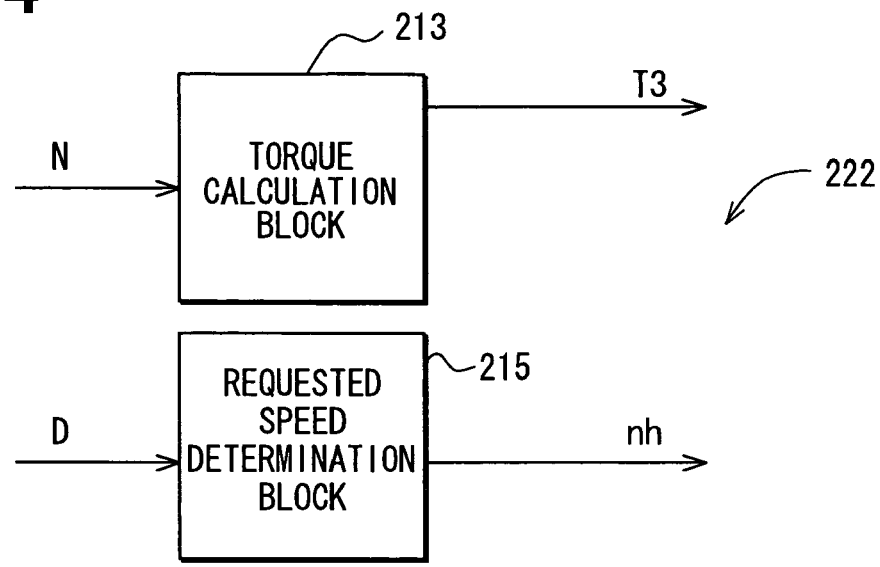
FIG. 4 is a block diagram showing a compressor control block of the energy control system according to the embodiment.

Subsequently, a further description will be given to the operation of the engine speed control in the compressor control block 222 shown in FIG. 2 with reference to FIG. 4.

The compressor control block 222 included in the air-conditioner controller 121 has a torque calculation block 213 and a requested speed determination block 215. The torque calculation block 213 calculates the requested auxiliary device torque T3 being a requested torque for driving of the compressor 120, for example. The engine speed is adopted as actual speed to represent torque on the engine basis. Torque required for driving a rotary machine such as the compressor 120 has a positive correlation with rotation speed. Therefore, the torque can be referred to a data map beforehand stored, in accordance with the engine rotation speed N, which corresponds to a rotation speed (compressor speed) of the compressor 120. For example, as temperature varies, torque for driving the compressor varies. The torque changes corresponding to a volume ratio in a variable displacement compressor. Therefore, the requested auxiliary device torque T3 can be further correctly calculated in consideration of the temperature and the volume ratio.

Subsequently, a description will be given to the operation of the requested speed determination block 215. The requested speed determination block 215 demands the engine speed in accordance with a requested driving level D of the compressor 120 such that the engine speed corresponds to the compressor speed. The requested driving level D is defined by the air-conditioner controller 121. For example, when increase in cooling capacity is requested in a cooling operation of the air conditioner, the engine speed is calculated, or referred to a data map beforehand stored, such that the compressor speed is enough to produce the cooling capacity. Thus, the requested speed determination block 215 outputs a requested rotation speed nh corresponding to the engine speed as demanded.

Figure 5:
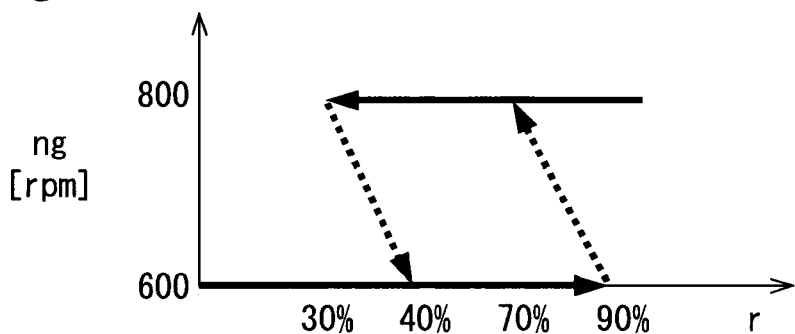
FIGS. 5 and 6 are graphs each showing a relationship between a requested speed ng and a generating torque ratio r in an engine speed control of the energy control system.
Figure 6:
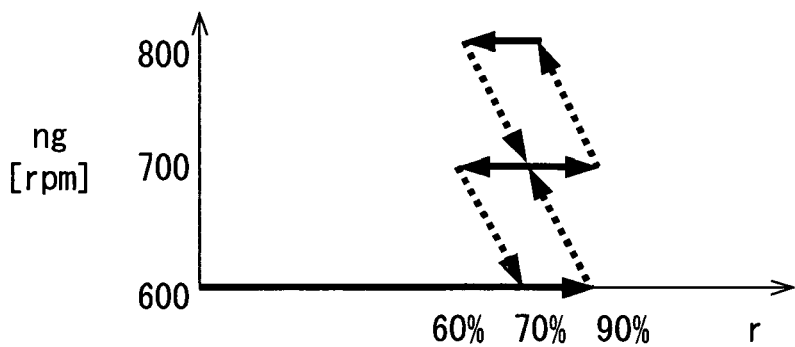

Operations of the engine speed performed in the power generation control will be described with reference to FIGS. 5, 6. In FIGS. 5, 6, each of the abscissa axes indicates a generating torque ratio r. The generating torque ratio r is calculated by dividing the requested power generating torque T2 by the maximum generation torque Tmax. In FIGS. 5, 6, each of the ordinate axes indicates the requested rotation speed ng. Another ratio may be defined on the basis of the electric power as described above, similarly to calculating the generating torque ratio r.

As shown by the broken line depicting transition in the requested rotation speed ng in FIG. 5, when the generating torque ratio r increases to 90%, the requested rotation speed ng increases from 600 rpm to 800 rpm. When the generating torque ratio r decreases to 30%, the requested rotation speed ng decreases from 800 rpm to 600 rpm. Specifically, when the generating torque ratio r increases to 90% at 600 rpm, the generating torque ratio r is requested to increase to 800 rpm. In this condition, as indicated by the broken line, the generating torque ratio r decreases from 90% to 70% as the speed changes from 600 rpm to 800 rpm. That is, torque required for power generation decreases as the speed changes from 600 rpm to 800 rpm. The speed 600 rpm is set as a base speed, at which electricity can be distributed to current consumers in a normal condition. The speed 800 rpm is set as a speed, at which electricity can be simultaneously distributed to a greater number of the current consumers (FIG. 1).

According to an example shown in FIG. 6, the requested rotation speed ng is changed in three states. When the requested rotation speed n is set in multiple states in such a manner, uncomfortable feeling can be reduced from the driver, and fuel efficiency can be enhanced.

A description will be given to a first example of a power generation control in reference to FIG. 7. In this power generation control, the example of the two-state control of engine speed shown in FIG. 5 is applied to the requested speed determination block 205 shown in FIG. 3.

First, in step S100, total power consumption of the current consumers and the battery 108 is calculated for producing the requested electric power (electric power generation) P. Specifically, the sum of power consumption of the respective current consumers, which includes the current consumers a1 to a3, b1 to b3, and charged and discharged electric power of the battery 108 is calculated, so that the requested electric power P is calculated. Subsequently, in step S102, the maximum generation Pmax at the present engine speed is referred to a data map beforehand stored, so that the generating torque ratio r is calculated by substituting the calculated requested electric power P and the maximum generation Pmax into the following equation: r=(P/Pmax)×100%.

Subsequently, in step S104, it is evaluated whether the generating torque ratio r is equal to or greater than 90%. When the generating torque ratio r is equal to or greater than 90%, the routine proceeds to step S106, in which increase in requested rotation speed ng is requested. That is, the requested rotation speed ng is increased by one rank, for example. When the generating torque ratio r is less than 90%, the routine proceeds to step S108, in which it is evaluated whether the generating torque ratio r is equal to or less than 30%. When the generating torque ratio r is greater than 30%, the routine proceeds to step S110, in which the present speed is requested. That is, the present speed is maintained. When the generating torque ratio r is equal to or less than 30%, the routine proceeds to step S112, in which decrease in requested rotation speed ng is requested. That is, the requested rotation speed ng is reduced by one rank, for example.

Subsequently, in step S114, it is evaluated whether the requested rotation speed ng is within the upper and lower limits. When the requested rotation speed ng is out of the upper and lower limits, the requested rotation speed ng is corrected to be corresponding one of the upper and lower limits, so that the requested rotation speed ng is determined as a final value. In step S116, the requested rotation speed ng is output to the engine speed control block 223. The upper and lower limits of the requested rotation speed may be changed in accordance with the shift position, or the like.

Figure 8:
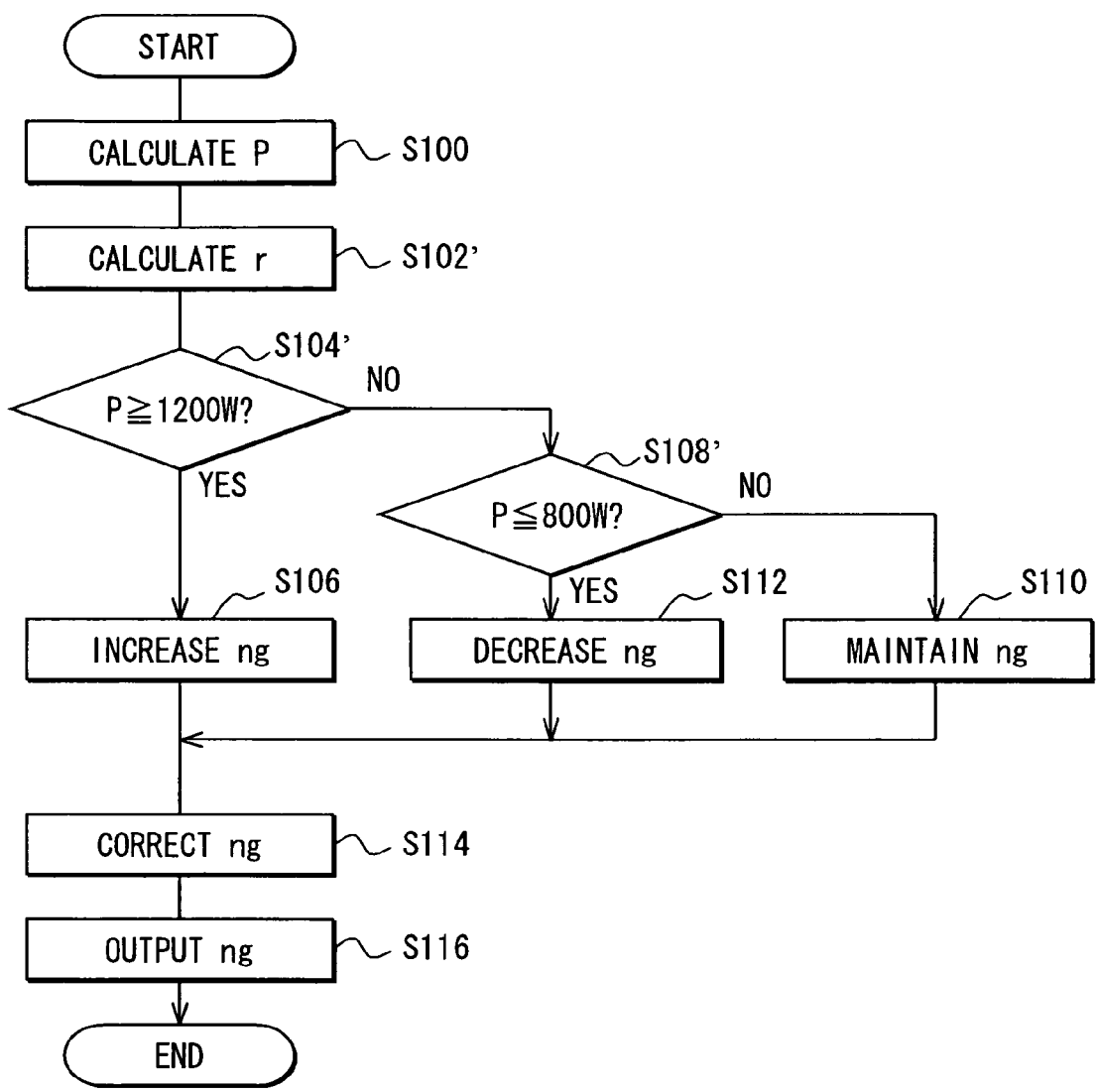
FIG. 8 is a flowchart showing a power generation control according to a second example.

A description will be given to a second example of a power generation control performed by the requested speed determination block 205 (FIG. 3), in reference to FIG. 8.

Figure 7:
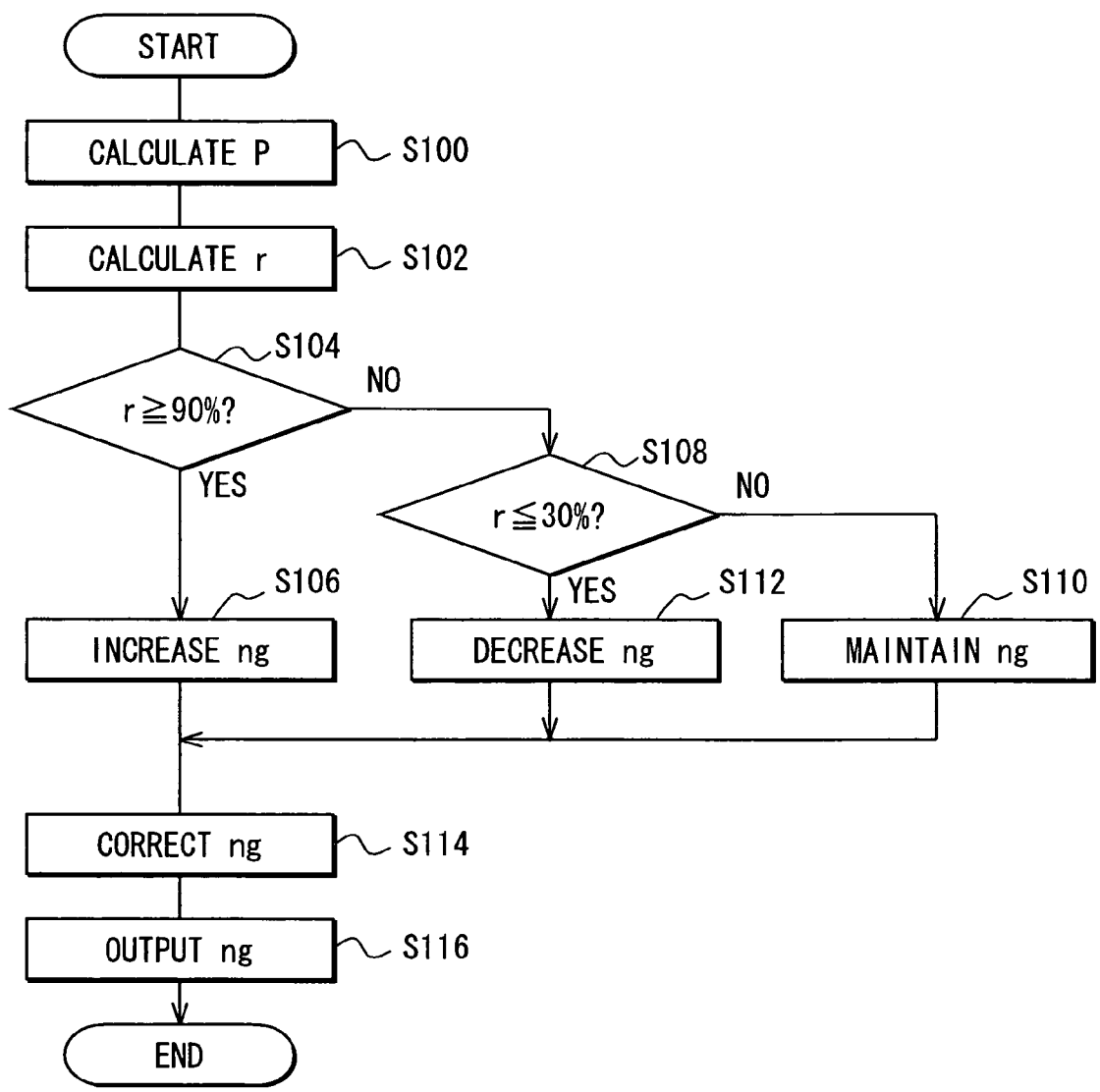
FIG. 7 is a flowchart showing a power generation control according to a first example.

In this example, the requested electric power (electric power generation) P is evaluated instead of the generating torque ratio r as referred to FIG. 7. In this example, as shown in FIG. 8, steps S102, S104, and S108 in FIG. 7 are modified to steps S102', S104', and S108'. More specifically, the requested electric power P is calculated in this example, instead of the generating torque ratio r=(P/Pmax)×100%. In this example, the requested rotation speed ng is defined in accordance with the requested electric power P. In step S104', when the requested electric power P is equal to or greater than a threshold such as 1200 W, the routine proceeds to step S106, in which the requested rotation speed ng is increased. That is, the requested rotation speed ng is increased by one rank, for example. In step S108', when the requested rotation speed ng is equal to or less than another threshold such as 800 W, the routine proceeds to step S112, in which the requested rotation speed ng is decreased. That is, the requested rotation speed ng is decreased by one rank, for example.

When the requested electric power P is small, a margin (Pmax−P) becomes large enough to adapting to further rapid increase in electric power generation, even when the maximum generation Pmax is small. Alternatively, when the requested electric power P is large, the margin (Pmax−P) becomes small, consequently it becomes difficult to adapt to further rapid increase in electric power generation unless the maximum generation Pmax increases. In view of these tendencies, the engine speed control is performed, so that electric power can be sufficiently supplied to the battery and the current consumer, while the margin of the electric power is secured. Thus, wasteful increase in speed can be restricted.

Figure 9:
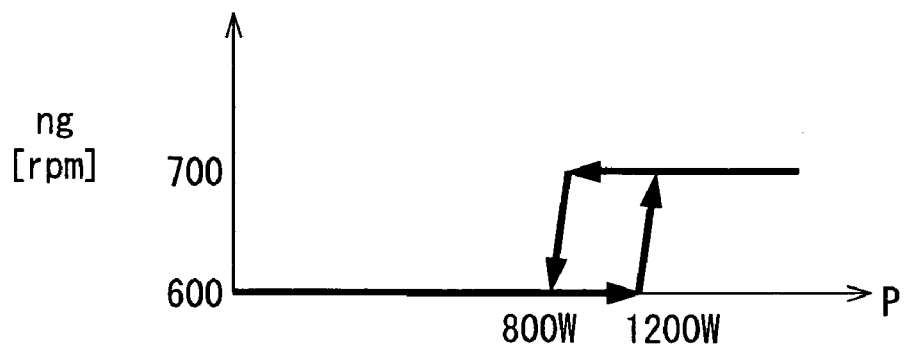
FIGS. 9, 10, and 11 are graphs each showing a relationship between the requested speed ng and the generating torque ratio r according to example controls.
Figure 10:
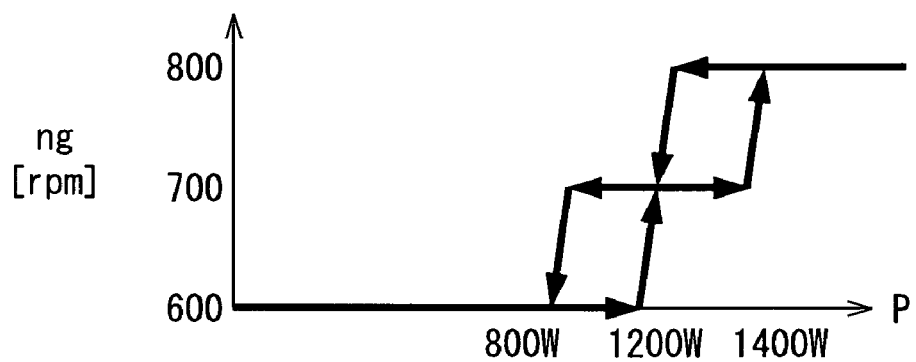
Figure 11:
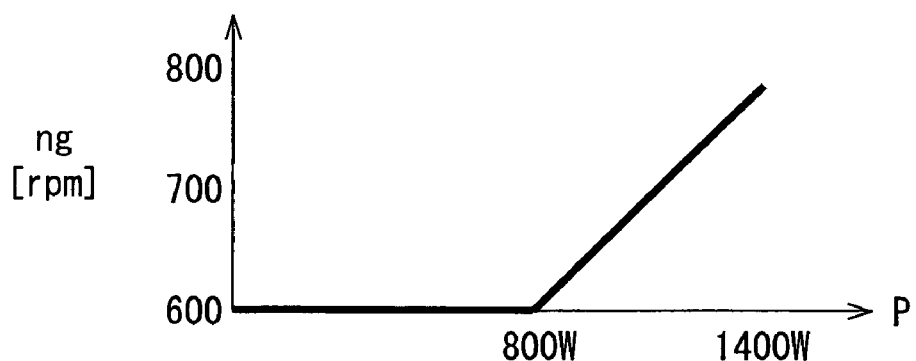

According to an example control shown in FIG. 9, the two-state control similar to the control in FIG. 5 is applied to the second example. According to an example control shown in FIG. 10, the three-state control similar to the control in FIG. 6 is applied to the second example. As shown in FIG. 11, the requested electric power P and the requested rotation speed ng may be changed correspondingly to each other in a predetermined range. The control may be performed by converting Pmax, P, which are electric power parameters in FIG. 8, into torque parameters as described above. Further, the requested electric power P may include only the power consumption of the current consumer, excluding the charged and discharged electric power of the battery.

Figure 12:
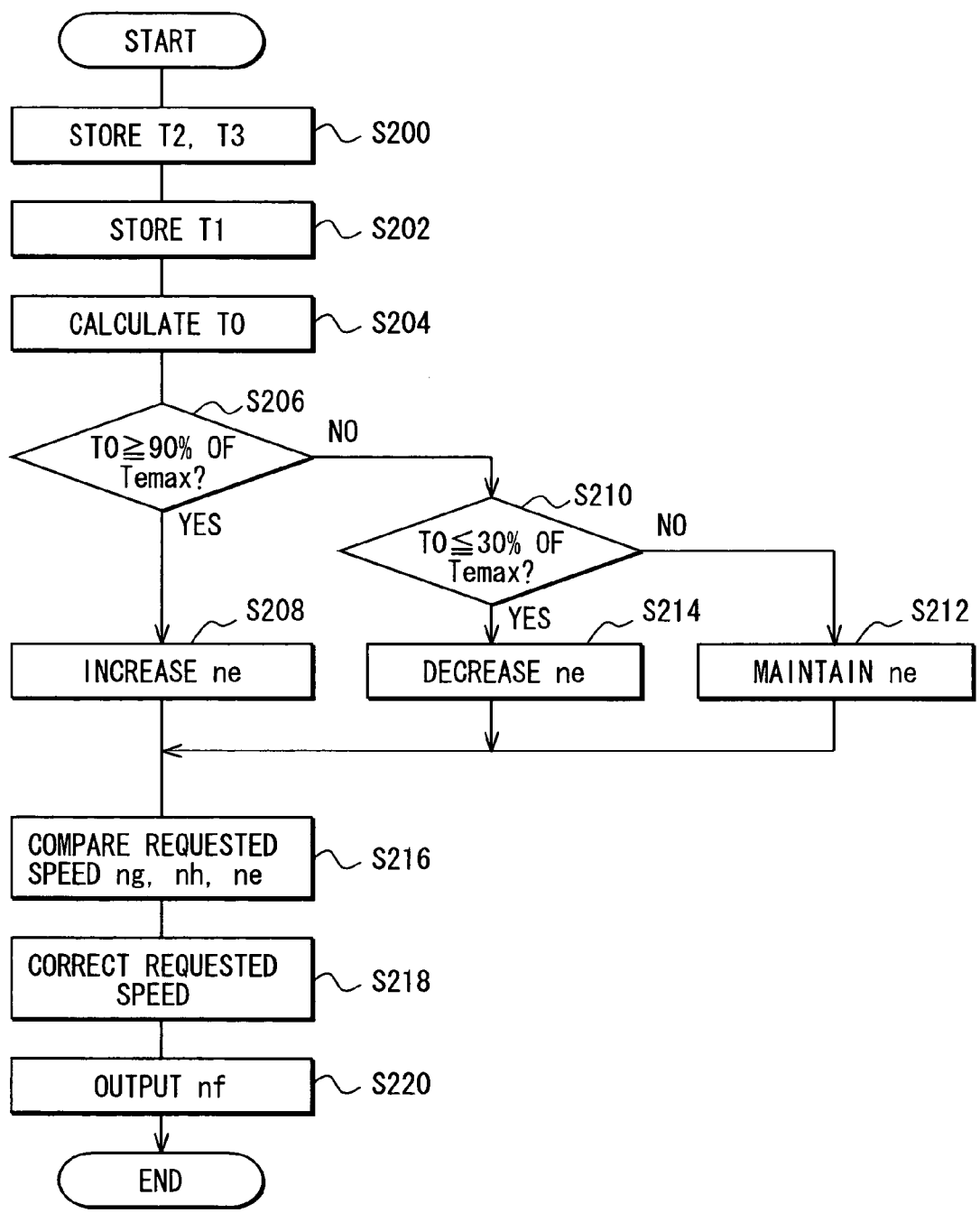
FIG. 12 is a flowchart showing a power generation control according to a third example.

A description of third example of the engine speed control block 223 is given in reference to FIG. 12.

First, in step S200, the requested power generating torque T2 and the requested auxiliary device torque T3 are stored. In step S202, the requested vehicle drive torque T1 is stored. Subsequently, in step S204, these requested torque T1, T2, and T3 are added to calculate the requested engine torque T0. Subsequently, in step S206, it is evaluated whether the requested engine torque T0 is equal to or greater than 90% of the maximum engine torque Temax. When the requested engine torque T0 is equal to or greater than 90% of Temax, the routine proceeds to step S208, in which increase in requested rotation speed ne is requested. That is, the requested rotation speed ne is increased by one rank, for example. When the requested engine torque T0 is equal to or greater than 90% of Temax, the routine proceeds to step S210, in which it is evaluated whether the requested engine torque T0 is equal to or less than 30% of the maximum engine torque Temax. When the requested engine torque T0 is greater than 30% of Temax, the routine proceeds to step S212, in which the present requested rotation speed ne is requested. When the requested engine torque T0 is equal to or less than 30% of Temax, the routine proceeds to step S214, in which decrease in requested rotation speed ne is requested. That is, the requested rotation speed ne is decreased by one rank, for example.

Subsequently, in step S216, a comparison is made among the requested rotation speed ng in the power generation control, a requested rotation speed nh in the auxiliary device control, and the requested rotation speed ne, so that the greatest one of the ng, nh, and ne is selected. That is, in step S216, states of the electric generator and the auxiliary device are evaluated. In step S218, it is further evaluated whether the one of the requested speed ng, nh, and ne is within upper and lower limits. When the one of the requested speed ng, nh, and ne is out of the upper and lower limits, the one of the requested speed ng, nh, and ne is corrected to be corresponding one of the upper and lower limits, so that the requested rotation speed nf is determined as a final value. In step S220, the requested rotation speed nf is set as a target value for the feedback control of idling speed.

Next, a description of defining the upper limit of the requested speed is described. The upper limit of the requested speed is determined in order to limit the creep torque caused by the torque converter in the vehicle. The creep torque corresponds to wheel driving torque transmitted to a wheel via the torque converter.

A wheel driving torque transmitted to the wheel in the idling state is a function of, i.e. related to the engine speed and the gear ratio. Accordingly, it may be preferable to set the requested speed such that the wheel driving torque (creep torque) does not become greater than a predetermined threshold. The wheel driving torque is defined on the basis of the requested speed and the gear ratio of the transmission.

Modified Example

A description of a power generation control according to a modified example of the above embodiments will be given in reference to FIGS. 13, 14. In this modified example, the engine speed is changed in response to a request for changing engine speed in the power generation control. This request is caused by the power generation control shown in FIG. 7 or FIG. 8.

Figure 13:
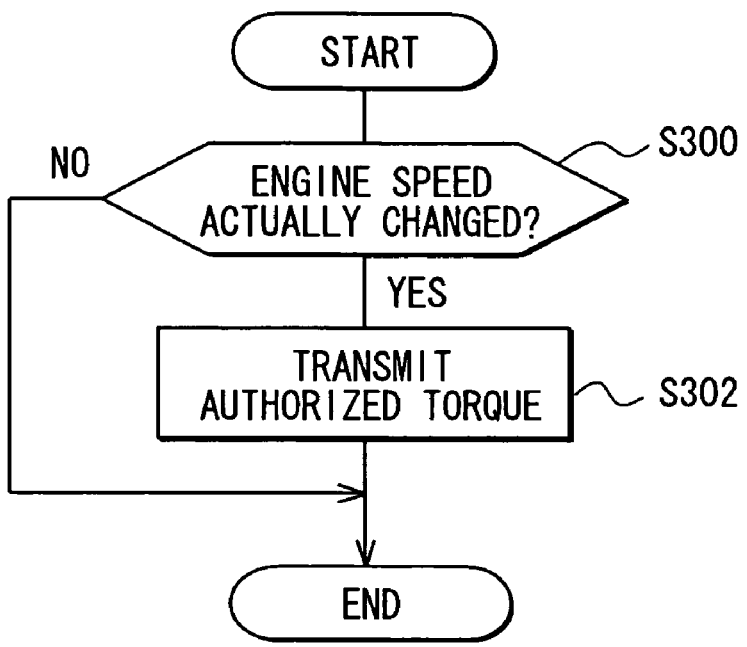
FIGS. 13, 14 are flowcharts showing a power generation control according to a modified example.

As referred to FIG. 13, in step S300, the power supply controller 105 evaluates whether change of the engine speed has been actually completed in the engine speed control described above. In step S302, when the change has been actually completed, the power supply controller 105 changes authorized torque and transmits the authorized torque to the electric generator controller 104. The power supply controller 105 authorizes using the authorized torque, which is power generating torque in according with the maximum generation Pmax corresponding to a new engine speed. The authorized torque is the engine torque component, which is calculated from the maximum generation Pmax and the engine speed and can be consumed by the electric generator 102.

Figure 14:
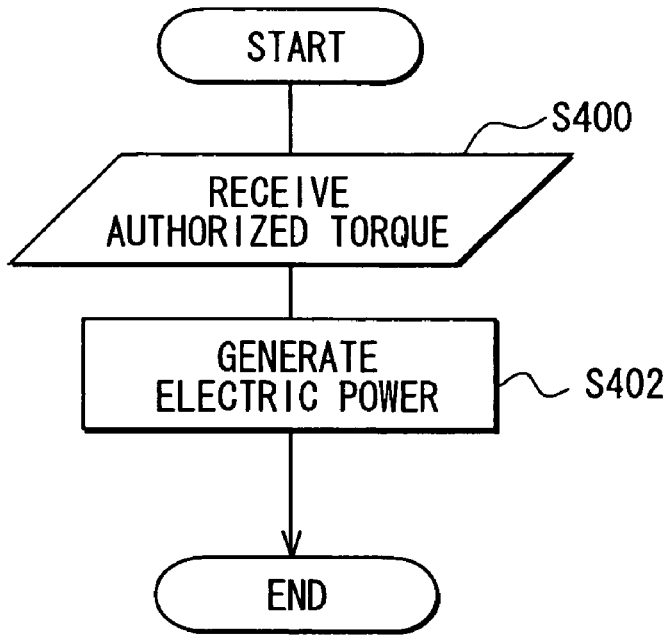

As referred to FIG. 14, in step S400, the power supply controller 105 receives the authorized torque. In step S402, the power supply controller 105 performs electric power generation corresponding to the requested power generating torque T2 in the range of the received authorized torque. In this embodiment, even when the requested rotation speed ng is changed, the electric generator controller 104 does not change a state of electric power generation unless an authorized torque allotted thereto is changed in accordance with a change of the actual speed. Thereby, the requested power generating torque T2 can be restricted from being increased to be greater than the authorized torque before the engine speed is changed in the electric power generation.

Modified Embodiment

In this modified embodiment, the requested electric power P is power consumption of the respective current consumers the including current consumers a1 to a3, b1 to b3. Alternatively, the requested electric power P is the charged and discharged electric power of the battery 108 added to the power consumption of the respective current consumers including the current consumers a1 to a3, b1 to b3.

Figure 15:
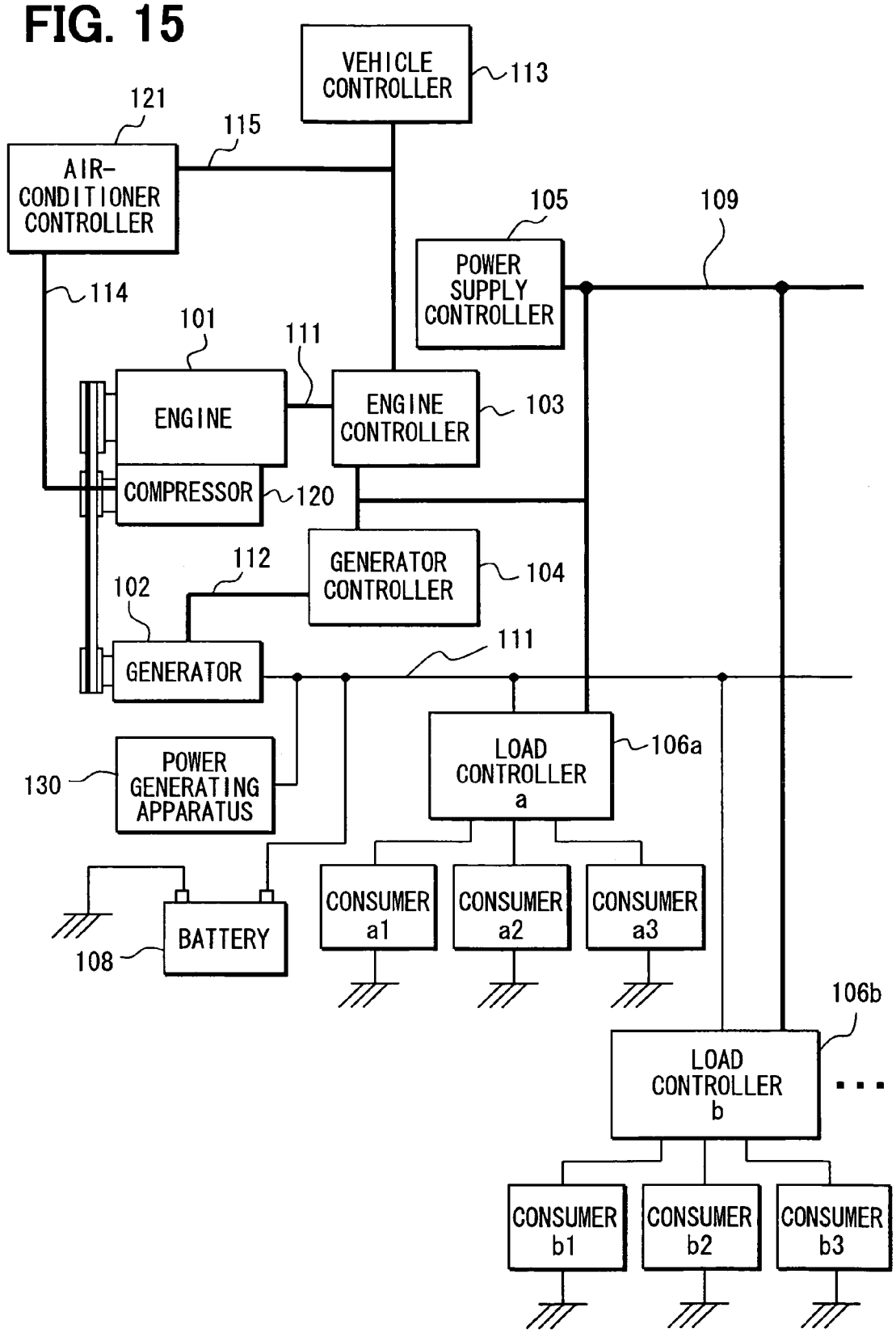
FIG. 15 is a block diagram showing a energy control system according to a modified embodiment.

As shown in FIG. 15, a power generating apparatus 130 is connected to the power supply system, in addition to the electric generator 102. In this structure, the requested electric power generation for the electric generator 102 may not be calculated correctly. Therefore, a thermal or optical car-mount power generating apparatus may be applied to the power supply system, as a power generating apparatus.

In this modified embodiment, the requested electric power P is defined as an amount, which is calculated by subtracting a generated power of the power generating apparatus 130 from the power consumption of the respective current consumers including current consumers a1 to a3, b1 to b3, or the charged and discharged electric power of the battery 108 added thereto. Thereby, it is possible to further correctly calculate the requested electric power generation, which is equivalent to the requested electric power P.

The engine speed controller may be applied to an engine speed controller mounted in the vehicle energy control system. The vehicle energy control system may include the engine controller 103, the generator controller 104, and the auxiliary device controller 121. The engine controller 103 controls the engine, which drives the electric generator 102 and the auxiliary device 120. The engine generates cruising energy. The generator controller 104 controls electric power generation of the electric generator 102, which supplies electricity to the battery 108 and the current consumer a1, a2, a3, b1, b2, b3. The auxiliary device controller 121 controls the driven state of the auxiliary device 120, and performs the feedback control for the engine speed as an output parameter to a target value on the basis of a predetermined input parameter.

The engine speed control, in which the engine speed is set at the target value, is applied to the idling speed control, for example. However, the engine speed control is not limited to be applied to the idling speed control. For example, the vehicle engine may be provided to an engine vehicle and a hybrid vehicle. The engine vehicle has only an engine as a cruising power source. The hybrid vehicle has an engine and a battery 108 as cruising power sources. Some kinds of hybrid vehicles excluding a completely parallel construction may be capable of setting the engine speed independently from the cruising state.

In the engine speed control, in which the engine speed is set at the target value, the target value may be altered corresponding to a predetermined input parameter excluding the above parameter in the above embodiments. In this case, a change in target value corresponding to the input parameter may be further superimposed to the target value, which is altered corresponding to the predetermined input parameter, in the engine speed control, in which the above parameter is used.

The engine speed controller may have the electric power generation calculation unit and the engine speed changing unit. The electric power generation calculation unit calculates the requested value or the present value of electric power generation of the electric generator 102. The engine speed changing unit requests increase in engine speed when a tendency toward shortage of power generation is determined on the basis of the requested value or the present value of the electric power generation. The engine speed changing unit requests increase in engine speed when a tendency toward an excess of margin in power generation is determined.

The electric power generation represents a quantity of generated electric power. The electric power generation may represent a generated current when voltage is constant. The mechanical output from the engine can be calculated by dividing the generated electric power by the efficiency of the electric generator 102. The load torque (consumed torque) of the electric generator 102 or the engine 101 can be calculated by dividing the mechanical output by the rotation speed of the electric generator 102 or the engine 101. The electric power generation may be represented by these values (parameters).

In the engine speed control, in which the engine speed is set at the target value, the target value is changed in accordance with a state of the electric generation. For example, the engine speed is increased when a state of shortage of power generation or a tendency toward shortage of power generation is determined. That is, the engine speed is increased when a shortage is expected. The engine speed is decreased when a state of excess of generating capacity or a tendency toward an excess of margin in power generation is determined. That is, the engine speed is decreased when an excess is expected.

For example, the maximum generation Pmax, for which the electric generator 102 can generate, has a close positive correlation with the engine speed. Accordingly, the engine speed is increased in a state of shortage of power generation, and the engine speed is decreased in a state of excess of margin in power generation, so that the margin in the power generation can be appropriately secured, without wastefully increasing the engine speed to incur deterioration in fuel consumption. In addition, such increase or decrease in engine speed can be achieved simply by changing the target value.

In a conventional engine speed control such as an idling rotation control, the engine speed may not be changed in accordance with a state of excess or short generating capacity. Accordingly, the conventional engine speed control may have a disadvantage that a generating capacity may become short in the state of idling rotation control. Consequently, the voltage of a power source system may become low, and a battery may cause severe discharge. By contrast, in the above embodiments, these problems can be improved, while suppressing increase in fuel consumption.

The engine speed changing unit may store a relationship between the requested value or the present value of the electric power generation. The engine speed changing unit may request a change in the engine speed on the basis of the requested value or the present value of the calculated electric power generation, and the relationship.

That is, when the electric power generation is small, consumed torque of the electric generator 102 is small. When the electric power generation is large, consumed torque of the electric generator 102 is large. The maximum generation Pmax, for which the electric generator 102 can generate, has a close positive correlation with the rotation speed (generator speed) of the electric generator 102.

Accordingly, when the electric power generation is large, and the consumed torque of the electric generator 102 increases, shortage of power generation can be restricted by increasing the engine speed to enhance the maximum generation Pmax of the electric generator 102. In addition, when the electric power generation is small, and the consumed torque of the electric generator 102 decreases, an excess generating capacity can be decreased and accompanied loss can be decreased by decreasing the engine speed to reduce the maximum generation Pmax of the electric generator 102.

The engine speed changing unit may request increase in engine speed when the requested electric power P is large. The engine speed changing unit may request increase in engine speed when the requested electric power P is small.

Specifically, the generating capacity is increased or decreased by increasing or decreasing the engine speed in accordance with the the requested electric power P instead of the actual electric power generation. Thereby, in case of a large demand (request) for electric power generation, the engine speed is increased to increase the maximum generation Pmax of the electric generator 102. Thus, shortage of power generation can be restricted. In addition, in case of a small demand for electric power generation, the engine speed is decreased to reduce the maximum generation Pmax of the electric generator 102. Thus, an excess generating capacity can be reduced, so that accompanied loss can be reduced.

The requested electric power generation may represent the electric power generation, which is demanded of the electric generator 102 in the vehicle-mounted power source system. The requested electric power generation can be calculated by various manners as described later. In addition, the actual electric power generation can be calculated as the product of the output voltage and the output current (generated current) of the electric generator 102. The actual electric power generation can be also calculated approximately by various systems of calculation.

The engine speed changing unit may request increase in engine speed when the ratio of the requested value or the present value of the electric power generation to the present maximum generation Pmax of the electric generator 102 is greater than a predetermined range. The present maximum generation Pmax of the electric generator 102 corresponds to the present engine speed. The engine speed changing unit may request decrease in engine speed when the ratio of the requested value or the present value of the electric power generation to the maximum generation Pmax is less than the predetermined range.

A power generation ratio is calculated by dividing the present electric power generation by the maximum generation Pmax. The engine speed may be regulated on the basis of the power generation ratio to appropriately secure the margin of the power generation. In this operation, the margin of the power generation can be steadily restricted from being excess of short. In the above calculation of the power generation ratio, the present electric power generation may be substituted to a predicted value of the electric power generation in the near future.

The engine speed changing unit may request increase in engine speed when the ratio of the requested electric power P to the maximum generation Pmax is greater than a predetermined range. The engine speed changing unit may request decrease in engine speed when the ratio of the requested electric power P to the maximum generation Pmax is less than the predetermined range.

In this operation, the ratio of power generation is calculated on the basis of the requested electric power P. Therefore, it is possible to restrict the power generation from being short due to delay in a change in the engine speed. That is, it is possible to quickly correspond to a change in the requested electric power P in order to change the margin of the power generation. Thus, a control responsibility can be improved.

The requested electric power P may be the electric power demanded from the current consumer a1, a2, a3, b1, b2, b3. That is, the requested electric power P may be a total of electric power (power consumption) required to be supplied to selected current consumers. Thereby, the requested electric power P can be accurately calculated in a simple manner.

The requested electric power P may be the electric power demanded from the current consumer a1, a2, a3, b1, b2, b3 and electric power for charging and discharging the battery 108. The electric power for charging and discharging the battery 108 represents a present value of charged and discharged electric power of the battery 108. The electric power for charging and discharging the battery 108 may represent a predicted value of the electric power in the near future. The electric power for charging and discharging the battery 108 may represent a detected value having a correlation therewith or a calculated value. In this operation, the maximum generation Pmax can be set by controlling the engine speed on the basis of electric power generation in consideration of charging and discharging of the battery 108. Therefore, the margin of the power generation can be retained in an appropriate range even when the battery 108 is greatly charged and discharged. In general, the charging and discharging the battery 108 may vary in accordance with voltage of the power source system. The remaining capacity of the battery 108 is normally maintained in a predetermined range. Therefore, it is possible to adopt a conventional power generation control system that performs the power generation control in order to maintain a remaining capacity of the battery 108 and the terminal voltage at a specific level.

The power generating apparatus 130 may be provided separately from the electric generator 102 to supply electricity to the battery 108 and the current consumer a1, a2, a3, b1, b2, b3. The requested electric power P may be the sum of the electric power demanded from the current consumer a1, a2, a3, b1, b2, b3 and the electric power for charging and discharging the battery 108. The requested electric power P may be calculated by subtracting the generated electric power of the power generating apparatus 130 from the electric power demanded from the current consumer a1, a2, a3, b1, b2, b3. In addition, vehicle-mounted solar cells, thermoelectric generators, exhaust energy generators, and the like may be provided as the power generating apparatus. In this case, the margin of the power generation can be accurately retained in an appropriate range even when the power generating apparatus other than the engine drive generator such as the electric generator 102 is provided.

An auxiliary device drive torque calculation unit may be provided. The auxiliary device drive torque calculation unit may calculate the requested value or the present value of the drive torque for the auxiliary device 120. The engine speed changing unit may request increase in engine speed when a tendency toward shortage of the power generation or a tendency toward shortage of the engine torque is determined on the basis of the requested value or the present value of the auxiliary device drive torque and the requested value or the present value of the electric power generation. The engine speed changing unit may request decrease in engine speed when a tendency toward an excess of the margin in the power generation and a tendency toward an excess of the margin in the engine torque are determined.

That is, in this operation, when the engine speed control is performed to set the engine speed at the target value, the engine speed control is performed in accordance with a magnitude of the drive torque of the auxiliary device 120, in addition to the engine speed control based on the electric power generation. More specifically, the engine torque has a close positive correlation with the engine speed. When the auxiliary device drive torque increases, the engine torque may become short. In this condition, the engine speed is increased. When the auxiliary device drive torque decreases, the engine torque may become excess. In this condition, the engine speed is decreased.

In this operation, the generating capacity of the electric generator 102 can be appropriately secured, and the margin of the engine torque can be appropriately secured, without wastefully increasing the engine speed. Thus, fuel consumption can be restricted. Here, this margin of the engine torque may be calculated by dividing an actual engine torque by the maximum engine torque Temax, which can be generated at present. Therefore, shortage of power generation can be restricted, so that the drivability can be improved, and the driving capacity for auxiliary device 120 can be secured.

For example, in a conventional engine speed control such as the idling rotation control, a change in idling speed of an engine is instructed in conformity to intermittency of an auxiliary device such as a compressor for airconditioning. However, in this conventional engine speed control, the engine speed is changed without determining short or excess engine torque caused by variation in auxiliary device drive torque. Consequently, this conventional engine speed control may be wasteful.

In contrast thereto, in the present engine speed control as described above, at least the auxiliary device drive torque is calculated. It is evaluated a situation, in which the engine torque is short or excess on the basis of at least the engine torque. The engine speed is regulated on the basis of the situation, in which the engine torque is short or excess. The engine torque is steadily consumed as cruising power generating torque, generator drive torque, and auxiliary device drive torque. The cruising power generating torque may be a fixed mechanical loss in an idling state. Accordingly, the requested engine torque may be estimated on the basis of the sum of the generator drive torque, which corresponds to the electric power generation, and the auxiliary device drive torque. The maximum engine torque Temax, which can be generated, has a close positive correlation with the engine speed. Therefore, the engine torque can be appropriately generated by setting an optimum engine speed on the basis of the requested engine torque.

The engine speed controller in the above embodiments may have an engine torque calculation unit. The engine torque calculation unit calculates the requested value or the present value of the output torque of the engine 101. The engine speed changing unit may request increase in engine speed when a tendency toward shortage of the engine torque is determined on the basis of the requested value or the present value of the engine torque. The engine speed changing unit may request decrease in engine speed when a tendency toward an excess of the margin in the engine torque is determined.

In this case, when the engine speed control is performed to set the engine speed at the target value, the target value is changed in accordance with a situation, in which the engine torque is short or excess. More specifically, when the engine torque is short, or when shortage in the engine torque is expected, the engine speed is increased. When the engine torque is excess, or when excess in the engine torque is expected, the engine speed is decreased.

More specifically, the engine torque has a close positive correlation with the engine speed. Accordingly, the engine speed can be stably maintained in a preferable range by regulating the engine speed in accordance with a situation, in which the engine torque is short or excess. Thus, a wasteful loss can be reduced, so that the electric generator 102 and the auxiliary device 120 can be restricted from being insufficiently driven. In addition, the margin of the engine torque, which is calculated by dividing actual engine torque by the maximum engine torque Temax, can be appropriately secured. Therefore, the power generation can be maintained, so that the drivability can be enhanced. In addition, the auxiliary device driving capacity can be maintained without wastefully increasing the engine speed. Thus, fuel consumption can be restricted from being deteriorated.

For example, in a conventional engine speed control such as the idling rotation control, a change in idling speed of an engine is instructed in conformity to intermittency of an auxiliary device such as a compressor for airconditioning. However, in this conventional engine speed control, the engine speed is changed without determining short or excess engine torque caused by variation in auxiliary device drive torque. Consequently, this conventional engine speed control may be wasteful.

In contrast thereto, the present engine speed control as described above increases or decreases the maximum engine torque Temax by regulating the engine speed on the basis of results of calculation and determination of the situation, in which the engine torque is short or excess. In general, the engine torque is steadily consumed as the cruising power generating torque, the generator drive torque, and the auxiliary device drive torque. However, the cruising power generating torque may be equivalent to a fixed mechanical loss in the idling state. Accordingly, the requested engine torque may be estimated on the basis of the sum of the generator drive torque, which corresponds to the electric power generation, and the auxiliary device drive torque. In addition, the maximum engine torque Temax, which can be generated, has a close positive correlation with the engine speed. Therefore, the engine torque can be appropriately generated by setting an optimum engine speed on the basis of the requested engine torque.

The engine speed changing unit may store a relationship between the requested value or the present value of the engine torque and the engine speed. The engine speed changing unit may request a change in the engine speed on the basis of the requested value or the present value of the calculated engine torque and the relationship. In general, the engine speed and the maximum engine torque Temax has a close positive correlation with each other. Accordingly, when the engine torque as calculated is large, the engine speed is correspondingly increased to suppress decrease in a margin rate of the engine torque. This margin rate of the engine torque can be calculated by the following equation: ((maximum engine torque Temax−engine torque)/maximum engine torque Temax).

When the engine torque as calculated is small, the engine speed is correspondingly decreased to suppress increase in the margin rate. Thereby, the margin rate of the engine torque can be appropriately secured while wasteful loss is reduced. The engine speed can be quickly increased by securing the margin rate, for example, when the vehicle is accelerated, so that the drivability can be further enhanced.

The engine speed changing unit may request increase in engine speed when the ratio of the requested value or the present value of the engine torque to the present maximum engine torque Temax, which corresponds to the present engine speed, is greater than a predetermined range. The engine speed changing unit may request decrease in engine speed when the ratio of the requested value or the present value of the engine torque to the present maximum engine torque Temax is less than the predetermined range.

In this operation, an additional generating capacity of the engine torque can be appropriately secured by regulating the engine speed in accordance with the ratio (typically, the margin rate of the engine torque) of the present engine torque to the maximum engine torque Temax. A predicted value of the engine torque in the near future may be substituted to the present engine torque. In this operation, the engine speed can be rapidly increased in an accelerating operation even when the engine torque is small, while suppressing increase in fuel consumption due to a wasteful increase in engine speed. Thus, the margin of the electric generation can be steadily restricted from becoming short or excess.

The engine speed changing unit may request a change in the engine speed on the basis of the request for a change in the engine speed, which is based on the requested value or the present value of the engine torque, and one of: the request for a change in the engine speed, which is based on the requested value or the present value of the electric power generation; and the request for a change in the engine speed, which is based on the requested value or the present value of the auxiliary device drive torque.

In this operation, the engine speed can be finally set on the basis of at least one of: the request for a change in engine speed in accordance with a situation, in which the electric power generation is short or excess; the request for a change in engine speed in accordance with a situation, in which auxiliary device drive torque is short or excess; and the request for a change in engine speed by the engine. The request for a change in engine speed may be a request for increasing in cooling air volume, for example. For example, the engine speed is changed on the basis of results of logical operation of respective requests for a change in engine speed. Thereby, it is possible to favorably meet a request of a whole system, which generates and consumes the engine torque.

The engine speed changing unit may restrict a change in the engine speed to be less than a predetermined upper limit while the engine is idling. Thereby, it is possible to restrict a situation, in which the engine speed rapidly increases in idling operation, consequently the driver feel incongruity and unrest. In addition, the vehicle can be restricted from moving due to increased creep in the torque converter. The idling operation may include not only the vehicle stopping state but also a creep state, in which the vehicle moves at low speed due to torque transmitted to the wheel through the torque converter.

The engine speed changing unit may change the upper limit in accordance with the gear ratio of the transmission device connected to the engine. Specifically, creep torque transmitted to the wheel becomes large at a high transmission gear ratio. In this condition, the upper limit of engine speed is set lower. The creep torque transmitted to the wheel becomes small at a low transmission gear ratio. In this condition, the upper limit of engine speed is set higher. Thereby, it is possible to enlarge a range, in which the engine speed is regulated, while suppressing influences of creep torque. In addition, the P range, i.e., the parking state, in which the transmission gear ratio is supposed to be zero, can be adopted as one of gear ratios of the transmission device. Since the creep state is not generated in the P range, it does not matter whether the upper limit of engine speed is set higher, as compared with the D range.

The engine controller 103 may calculate an allowable torque (authorized torque), being a consumable toque, in the range of the engine torque, thereby transmitting the allowable torque to the generator controller 104 or the auxiliary device controller 121. The generator controller 104 or the auxiliary device controller 121 may consume the engine torque in the range of the received allowable torque. The engine controller 103 may change the engine speed, by serving as the engine speed changing unit, in accordance with the request for the change in the engine speed. Thereafter, the engine controller 103 may transmit the change in the allowable torque, which corresponds to the changed engine speed, to the generator controller 104 or the auxiliary device controller 121.

In this operation, the electric power generation, the engine torque, or the auxiliary device drive torque, for example is changed after the change in engine speed is actually completed on the basis of the request for the change in engine speed, which is attributable to the request for the change in electric power generation or engine torque. Therefore, it is possible to restrict shortage in engine torque and shortage in electric power generation, which are caused by restrictions on the maximum engine torque Temax.

In the above embodiments, a present value (present auxiliary device torque) T3 of the auxiliary device torque may be substituted to the requested auxiliary device torque T3. A present value (present engine torque) T0 of the requested engine torque may be substituted to the requested engine torque T0.

The above embodiments can be combined as appropriate.

It needs to be appreciated that while the processes of the embodiments of the present embodiment have been described herein as including a specific sequence of steps, further alternative embodiments including various other sequences of these steps and/or additional steps not disclosed herein are intended to be within the steps of the present embodiment.

It should not be interpreted that the embodiment is limited to the following embodiments but the embodiment may be of course embodied through a combination thereof with a known technology or a technology equivalent thereto.

Various modifications and alternations may be diversely made to the above embodiments without departing from the spirit of the present embodiment.

What is claimed is:

1. An engine speed controller provided to a vehicle energy control system that includes an engine controller, a generator controller, and an auxiliary device controller, the engine controller controlling an engine, which drives a generator, an auxiliary device, and a vehicle, the generator generating electricity and supplying the electricity to a battery and a plurality of current consumers, the generator controller controlling the generator, the auxiliary device controller controlling the auxiliary device, the engine speed controller performing a feedback control such that engine speed substantially coincides at a target value, the engine speed controller comprising:
an electric power generation calculation unit that calculates one of a requested power generation and a present power generation of the generator; and
an engine speed changing unit that evaluates tendency of power generation on the basis of the one of the requested power generation and the present power generation,
wherein the engine speed changing unit requests increase in the engine speed when the engine speed changing unit determines the power generation to be inclined toward shortage, and
the engine speed changing unit requests decrease in the engine speed when the engine speed changing unit determines the power generation to be inclined toward excess.

2. The engine speed controller according to claim 1,
wherein the engine speed changing unit stores a relationship between the engine speed and the one of the requested power generation and the present power generation, and
the engine speed changing unit requests a change in the engine speed on the basis of the one of the requested power generation and the present power generation in reference to the relationship.

3. The engine speed controller according to claim 2,
wherein the engine speed changing unit requests increase in the engine speed when the requested power generation is large, and
the engine speed changing unit requests decrease in the engine speed when the requested power generation is small.

4. The engine speed controller according to claim 1,
wherein the engine speed changing unit calculates a first ratio of the one of the requested power generation and the present power generation to a present maximum generation of the generator, the present maximum generation corresponding to a present engine speed,
the engine speed changing unit requests increase in the engine speed when the first ratio is greater than a first predetermined range, and
the engine speed changing unit requests decrease in the engine speed when the first ratio is less than the first predetermined range.

5. The engine speed controller according to claim 4,
wherein the engine speed changing unit calculates a second ratio of the requested power generation to the maximum generation,
the engine speed changing unit requests increase in the engine speed when the second ratio is greater than a second predetermined range, and
the engine speed changing unit requests decrease in the engine speed when the second ratio is less than the second predetermined range.

6. The engine speed controller according to claim 3, wherein the requested power generation includes electric power demanded from the plurality of current consumers.

7. The engine speed controller according to claim 3, wherein the requested power generation includes electric power demanded from the plurality of current consumers and electric power for charging and discharging the battery.

8. The engine speed controller claim 6, further comprising:
a power generating apparatus that generates electricity and supplies the electricity to the battery and the plurality of current consumers,
wherein the requested power generation is one of:
a sum of the electric power demanded from the plurality of current consumers and electric power for charging and discharging the battery; and
a value calculated by subtracting electric power generated by the power generating apparatus from the electric power demanded from the plurality of current consumers.

9. The engine speed controller according to claim 1, further comprising:
an auxiliary device drive torque calculation unit that calculates one of a requested auxiliary device torque and a present auxiliary device torque of the auxiliary device,
wherein the engine speed changing unit evaluates tendency of one of engine torque and power generation on the basis of the one of the requested auxiliary device torque and the present auxiliary device torque of the auxiliary device and the one of the requested power generation and the present power generation,
the engine speed changing unit requests increase in the engine speed when the engine speed changing unit determines the one of the power generation and the engine torque to be inclined toward shortage, and
the engine speed changing unit requests decrease in the engine speed when the engine speed changing unit determines the one of the power generation and the engine torque to be inclined toward excess.

10. The engine speed controller according to claim 9, wherein the engine speed changing unit requests a change in the engine speed on the basis of a combination of any two of the following three:
request for a change in the engine speed, which is based on one of requested engine torque and present engine torque;

request for a change in the engine speed, which is based on one of requested power generation and present power generation; and request for a change in the engine speed, which is based on one of requested auxiliary device torque and present auxiliary device torque.

11. The engine speed controller according to claim 1, wherein the engine speed changing unit restricts a change in the engine speed to be less than an upper limit when the engine is in an idling operation.

12. The engine speed controller according to claim 11, wherein the engine speed changing unit sets the upper limit according to a present gear ratio of a transmission device connected to the engine.

13. The engine speed controller according to claim 1,
wherein the engine controller calculates an allowable torque to be equal to or less than the engine torque, the engine controller transmits the allowable torque to one of the generator controller and the auxiliary device controller, the one of the generator controller and the auxiliary device controller consumes the engine torque within the allowable torque, the engine controller controls the engine speed changing unit to change the engine speed according to the request of change in the engine speed, the engine controller changes the allowable torque corresponding to the change in the engine speed, and the engine controller transmits the change in the allowable torque to the one of the generator controller and the auxiliary device controller.

14. An engine speed controller provided to a vehicle energy control system that includes an engine controller, a generator controller, and an auxiliary device controller, the engine controller controlling an engine, which drives a generator, an auxiliary device, and a vehicle, the generator generating electricity and supplying the electricity to a battery and a plurality of current consumers, the generator controller controlling the generator, the auxiliary device controller controlling the auxiliary device, the engine speed controller performing a feedback control such that engine speed substantially coincides at a target value, the engine speed controller comprising:

an engine torque calculation unit that calculates one of a requested engine torque and a present engine torque of the engine; and an engine speed changing unit that evaluates tendency of engine torque on the basis of the one of the requested engine torque and the present engine torque, wherein the engine speed changing unit requests increase in the engine speed when the engine speed changing unit determines the engine torque to be inclined toward shortage, and the engine speed changing unit requests decrease in the engine speed when the engine speed changing unit determines the engine torque to be inclined toward excess.

15. The engine speed controller according to claim 14,
wherein the engine speed changing unit stores a relationship between the engine speed and the one of the requested engine torque and the present engine torque, and the engine speed changing unit requests a change in the engine speed on the basis of the one of the requested engine torque and the present engine torque in reference to the relationship.

16. The engine speed controller according to claim 14,
wherein the engine speed changing unit calculates a ratio of the one of the requested engine torque and the present engine torque to a present maximum engine torque, the present maximum engine torque corresponding to a present engine speed, the engine speed changing unit requests increase in the engine speed when the ratio is greater than a predetermined range, and the engine speed changing unit requests decrease in the engine speed when the ratio is less than the predetermined range.

17. The engine speed controller according to claim 14, wherein the engine speed changing unit requests a change in the engine speed on the basis of a combination of any two of the following three:

request for a change in the engine speed, which is based on one of requested engine torque and present engine torque;

request for a change in the engine speed, which is based on one of requested power generation and present power generation; and request for a change in the engine speed, which is based on one of requested auxiliary device torque and present auxiliary device torque.

18. The engine speed controller according to claim 14, wherein the engine speed changing unit restricts a change in the engine speed to be less than an upper limit when the engine is in an idling operation.

19. The engine speed controller according to claim 18, wherein the engine speed changing unit sets the upper limit according to a present gear ratio of a transmission device connected to the engine.

20. The engine speed controller according to claim 14,
wherein the engine controller calculates an allowable torque to be equal to or less than the engine torque, the engine controller transmits the allowable torque to one of the generator controller and the auxiliary device controller, the one of the generator controller and the auxiliary device controller consumes the engine torque within the allowable torque, the engine controller controls the engine speed changing unit to change the engine speed according to the request of change in the engine speed, the engine controller changes the allowable torque corresponding to the change in the engine speed, and the engine controller transmits the change in the allowable torque to the one of the generator controller and the auxiliary device controller.

21. A control method comprising:

calculating one of a requested power generation and a present power generation performed using a generator driven by an engine for generating electricity;

evaluating tendency of power generation on the basis of the one of the requested power generation and the present power generation;

requesting increase in the engine speed when determining the power generation to be inclined toward shortage;

requesting decrease in the engine speed when determining the power generation to be inclined toward excess; and operating the engine speed in accordance with the request of the engine speed.

22. The control method according to claim 21, further comprising:
 storing a relationship between the engine speed and the one of the requested power generation and the present power generation; and
 requesting a change in the engine speed on the basis of the one of the requested power generation and the present power generation in reference to the relationship.

23. The control method according to claim 22, further comprising:
 requesting increase in the engine speed when the requested power generation is large; and
 requesting decrease in the engine speed when the requested power generation is small.

24. The control method according to claim 21, further comprising:
 calculating a first ratio of the one of the requested power generation and the present power generation to a present maximum generation of the generator, the present maximum generation corresponding to a present engine speed;
 requesting increase in the engine speed when the first ratio is greater than a first predetermined range; and
 requesting decrease in the engine speed when the first ratio is less than the first predetermined range.

25. The control method according to claim 24, further comprising:
 calculating a second ratio of the requested power generation to the maximum generation;
 requesting increase in the engine speed when the second ratio is greater than a second predetermined range; and
 requesting decrease in the engine speed when the second ratio is less than the second predetermined range.

26. The control method according to claim 23, further comprising:
 supplying electric power to a plurality of current consumers,
 wherein the requested power generation includes electric power demanded from the plurality of current consumers.

27. The control method according to claim 23, further comprising:
 supplying electric power to a plurality of current consumers; and
 charging and discharging a battery,
 wherein the requested power generation includes electric power demanded from the plurality of current consumers and electric power for charging and discharging the battery.

28. The control method claim 26, further comprising:
 generating electricity for supplying the electricity to a battery and the plurality of current consumers; and
 calculating the requested power generation by adding the electric power demanded from the plurality of current consumers to the electric power for charging and discharging the battery.

29. The control method according to claim 21, further comprising:
 calculating one of a requested auxiliary device torque and a present auxiliary device torque of an auxiliary device;
 evaluating tendency of one of engine torque and power generation on the basis of the one of the requested auxiliary device torque and the present auxiliary device torque of the auxiliary device and the one of the requested power generation and the present power generation;
 requesting increase in the engine speed when determining the one of the power generation and the engine torque to be inclined toward shortage; and
 requesting decrease in the engine speed when determining the one of the power generation and the engine torque to be inclined toward excess.

30. The control method according to claim 29, further comprising:
 requesting a change in the engine speed on the basis of a combination of any two of the following three:
 request for a change in the engine speed, which is based on one of requested engine torque and present engine torque;
 request for a change in the engine speed, which is based on one of requested power generation and present power generation; and
 request for a change in the engine speed, which is based on one of requested auxiliary device torque and present auxiliary device torque.

31. The control method according to claim 21, further comprising:
 restricting a change in the engine speed to be less than an upper when the engine is in an idling operation.

32. The engine speed controller according to claim 31, further comprising:
 setting the upper limit according to a present gear ratio of a transmission device connected to the engine.

33. The control method according to claim 29, further comprising:
 calculating an allowable torque consumed in one of the generator and the auxiliary device within the engine torque;
 changing the engine speed according to the request of change in the engine speed; and
 changing the allowable torque corresponding to the change in the engine speed.

34. A control method comprising:
 calculating one of a requested engine torque and a present engine torque of an engine that drives a generator for generating electricity;
 evaluating tendency of engine torque on the basis of the one of the requested engine torque and the present engine torque;
 requesting increase in the engine speed when determining the engine torque to be inclined toward shortage;
 requesting decrease in the engine speed when determining the engine torque to be inclined toward excess; and
 operating the engine speed in accordance with the request of the engine speed.

35. The control method according to claim 34, further comprising:
 storing a relationship between the engine speed and the one of the requested engine torque and the present engine torque; and
 requesting a change in the engine speed on the basis of the one of the requested engine torque and the present engine torque in reference to the relationship.

36. The control method according to claim 34, further comprising:
 calculating a ratio of the one of the requested engine torque and the present engine torque to a present maximum engine torque, the present maximum engine torque corresponding to a present engine speed;

requesting increase in the engine speed when the ratio is greater than a predetermined range; and requesting decrease in the engine speed when the ratio is less than the predetermined range.

37. The control method according to claim 34, further comprising:

requesting a change in the engine speed on the basis of a combination of any two of the following three:

request for a change in the engine speed, which is based on one of requested engine torque and present engine torque;

request for a change in the engine speed, which is based on one of requested power generation and present power generation; and request for a change in the engine speed, which is based on one of requested auxiliary device torque and present auxiliary device torque.

38. The control method according to claim 34, further comprising:

requesting a change in the engine speed to be less than an upper limit when the engine is in an idling operation.

39. The control method according to claim 38, further comprising:

setting the upper limit according to a present gear ratio of a transmission device connected to the engine.

40. The control method according to claim 34, further comprising:

calculating an allowable torque consumed in one of the generator and an auxiliary device within the engine torque;

changing the engine speed according to the request of change in the engine speed; and changing the allowable torque corresponding to the change in the engine speed.

* * * * *